United States Patent
Sriver et al.

(10) Patent No.: US 7,895,084 B2
(45) Date of Patent: Feb. 22, 2011

(54) METHOD AND SYSTEM FOR PROVIDING PURCHASING ON A WIRELESS DEVICE

(75) Inventors: Joe Sriver, Minneapolis, MN (US); Wade Beavers, Rochester, MN (US)

(73) Assignee: DoApp, Inc., Minneapolis, MN (US)

( * ) Notice: Subject to any disclaimer, the term of this patent is extended or adjusted under 35 U.S.C. 154(b) by 48 days.

(21) Appl. No.: 12/121,652

(22) Filed: May 15, 2008

(65) Prior Publication Data
US 2009/0287581 A1 Nov. 19, 2009

(51) Int. Cl.
G06Q 30/00 (2006.01)
G06F 17/30 (2006.01)
(52) U.S. Cl. .......................... 705/26; 705/27
(58) Field of Classification Search .......... 705/26, 705/27
See application file for complete search history.

(56) References Cited

U.S. PATENT DOCUMENTS

| | | | |
|---|---|---|---|
| 7,565,332 B2 | 7/2009 | Williams et al. | |
| 2001/0049636 A1* | 12/2001 | Hudda et al. | 705/26 |
| 2006/0036502 A1* | 2/2006 | Farrell | 705/23 |
| 2006/0106674 A1* | 5/2006 | Muller | 705/14 |
| 2008/0082426 A1* | 4/2008 | Gokturk et al. | 705/27 |
| 2008/0097871 A1 | 4/2008 | Williams et al. | |
| 2008/0235123 A1 | 9/2008 | Olliphant et al. | |
| 2008/0267504 A1* | 10/2008 | Schloter et al. | 382/181 |
| 2008/0300980 A1 | 12/2008 | Benjamin et al. | |
| 2009/0144066 A1 | 6/2009 | Van Luchene et al. | |
| 2009/0235149 A1 | 9/2009 | Frohwein | |
| 2009/0248996 A1 | 10/2009 | Mandyam et al. | |

OTHER PUBLICATIONS

"Trueposition Partners with GPShopper to Offer Wireless Operators Location-Aware Shopping Services" (PR Newswire. New York. Mar. 28, 2007).*
Co-pending U.S. Appl. No. 12/429,884 filed Apr. 24, 2009.
Co-pending U.S. Appl. No. 12/606,008 filed Oct. 29, 2009.
Co-pending U.S. Appl. No. 12/606,018 filed Oct. 26, 2009.
Co-pending U.S. Appl. No. 12/802,525 filed Jun. 7, 2010.
Non-Final Office Action dated Aug. 25, 2010, in Co-Pending U.S. Appl. No. 12/429,884, filed Apr. 24, 2009.

* cited by examiner

*Primary Examiner*—Jason B Dunham
*Assistant Examiner*—Courtney Stopp
(74) *Attorney, Agent, or Firm*—Perkins Coie LLP

(57) ABSTRACT

A method and system for processing purchases from a wireless device. The method includes, responsive to a search command received from the wireless device, executing a search in a retailer database. The method includes transmitting a search result to the wireless device for display. The method includes, responsive to a purchase command received from the wireless device, processing a sales transaction with a selected retailer.

18 Claims, 3 Drawing Sheets

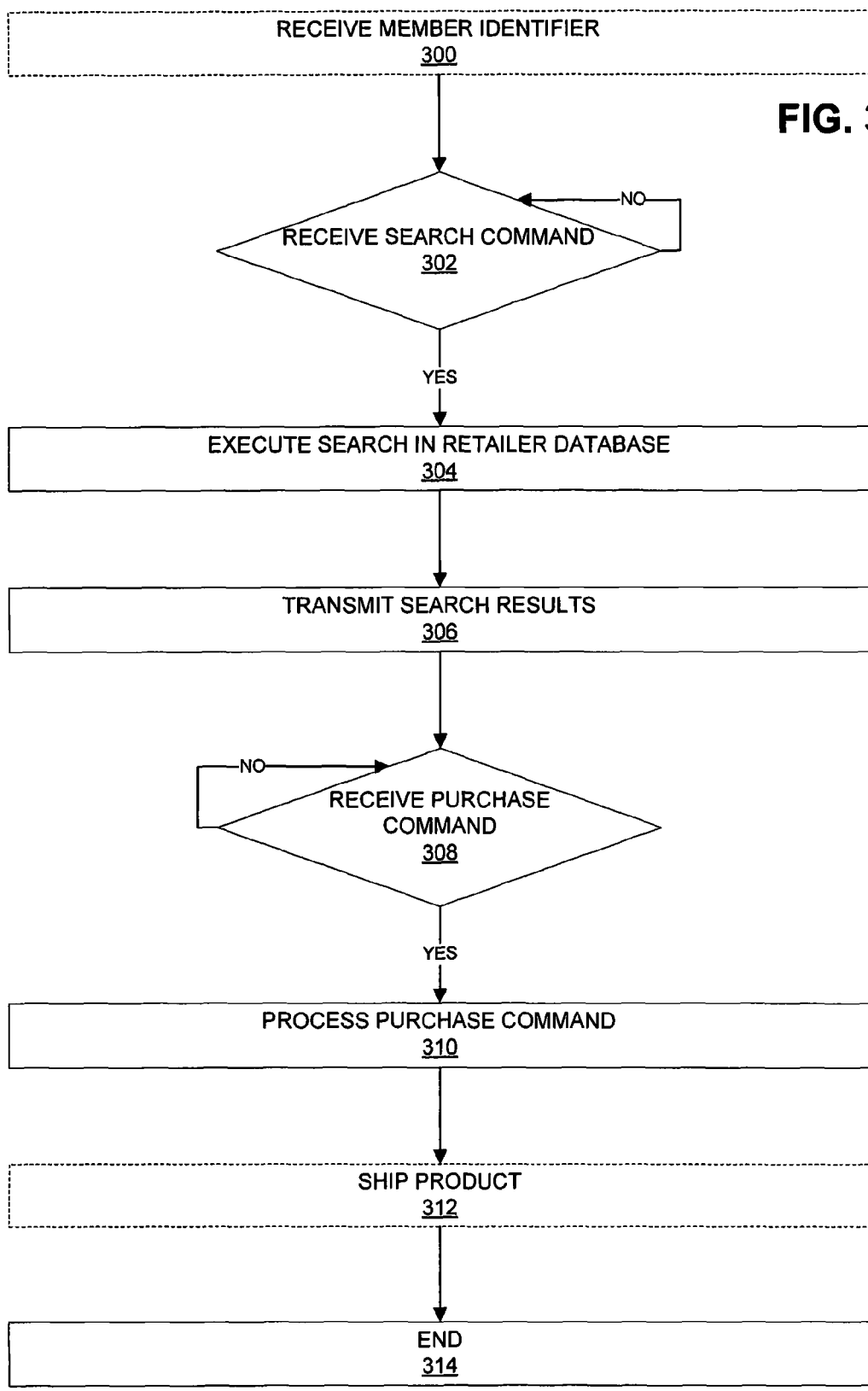

METHOD AND SYSTEM FOR PROVIDING PURCHASING ON A WIRELESS DEVICE

BACKGROUND

Brick and mortar retail stores include a physical presence, for example, a store selling products in a building accessible to customers. The store is staffed by employees or contractors and offers offer face-to-face customer experiences. In addition, brick and mortar retail stores carry product inventory on-premise, which improves the customer experience in the following ways.

First, a customer can physically see and handle the product before purchase. This is important for product purchase where "fit" and "feel" is important, such as purchasing running shoes, riding lawn mowers, bicycles, etc.

Second, the customer can take possession of a purchased product immediately. This is important when the customer needs the product in a short timeframe.

Third, the retail store offers live support staff to interact with the customer. For some customers, this improves the customer experience.

In contrast, an online store includes an internet-only presence, such as a retail website configured to display a catalog of available products and accept purchase orders.

First, customers find it easy to comparison shop, whether for price or similar products, by visiting various online stores on the Internet. Such comparison shopping can be done from the convenience of the customer's home or wherever there is Internet access.

Second, online stores can offer a lower price to users due to their lower overhead. Online stores do not need to maintain a physical store in a customer-accessible location, can maintain lower inventory levels, and can reduce or eliminate sales taxes.

Third, online stores can offer greater convenience by being available around-the-clock. There is no need to visit during business hours.

Thus, both brick-and-mortar retail stores and online stores offer their own advantages. However, it is difficult to combine the two models, so that the customer experience is improved. A customer can visit a brick-and-mortar retail store, but will not usually have easy Internet access, and therefore can not comparison shop after examining and deciding to buy the product.

BRIEF DESCRIPTION OF DRAWINGS

FIG. 3 depicts an example procedure for processing purchases from a wireless device.

DETAILED DESCRIPTION

A website allows members to search for and purchase products from a wireless device. This occurs after the member has visited a brick-and-mortar store to examine a product. A website server executes the product search on a retailer database and returns a listing of retailers offering similar products and associated prices. The listed retailers can be nearby brick-and-mortar stores who are carrying the product at a lower price or online stores. This allows the member to conveniently select the product from a desired retailer for purchase after examining the product.

Figure 1:
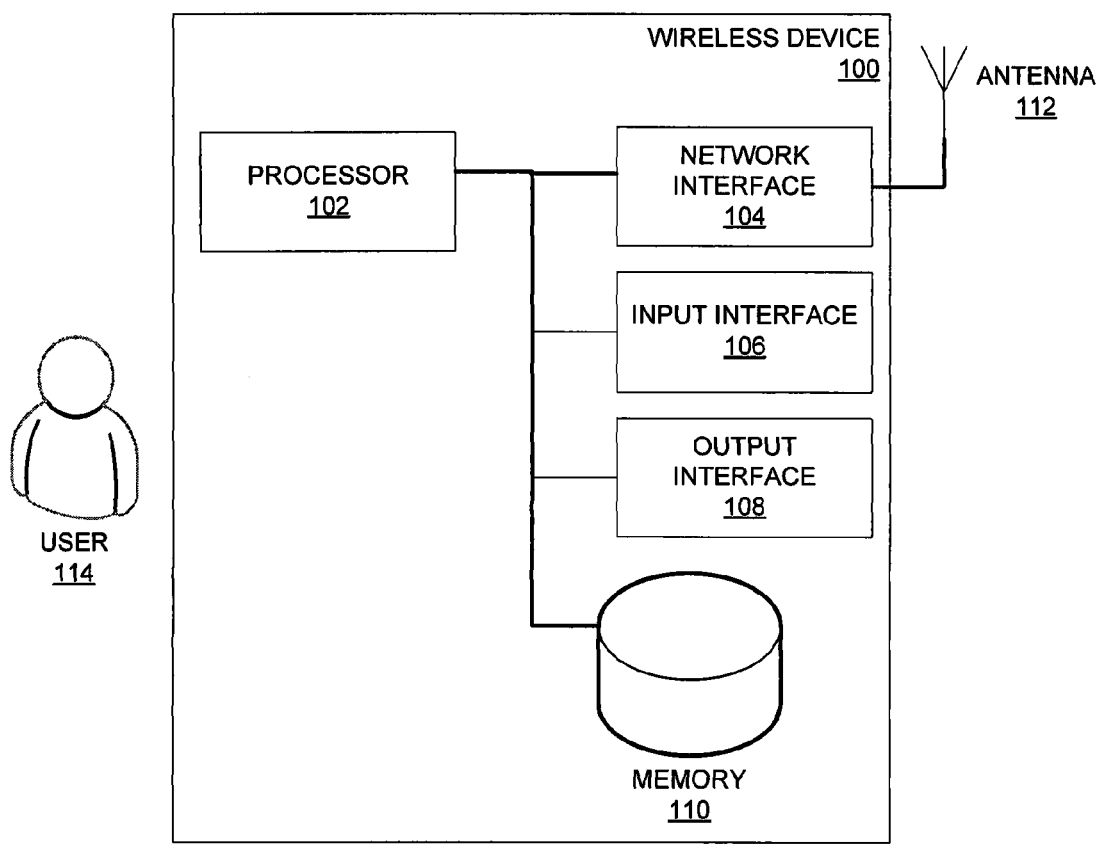
FIG. 1 depicts an example wireless device for completing purchases.

FIG. 1 depicts an example wireless device for completing purchases. The wireless device 100 can be a cellular phone, a PDA, a laptop computer, or any portable computing device configured to communicate via a wireless network. The wireless device 100 responds to user commands and displays output.

The wireless device 100 includes a processor 102. The processor 102 can be a general-purpose processor configured to execute computer-readable instructions operating the wireless device 100 and associated peripherals. In an example embodiment, the wireless device 100 can include multiple specialized processors, each processor optimized to perform a specific type of processing, such as encryption and decryption, graphics-related calculations, or other specialized processing.

The wireless device 100 includes a network interface 104. For example, the network interface 104 communicates with a cellular wireless network or a short range wireless network. The network interface 104 converts outgoing voice and data signals to wireless signals for transmission. The network interface 104 also converts incoming wireless signals to voice and data signals. The wireless device 100 can include multiple network interfaces or a network interface configured to interface with multiple networks. Wireless network interfaces can communicate via an antenna 112.

A short-range wireless network can be a Wi-Fi, Wi-Bree or Bluetooth network. Such networks are configured to carry data over short-ranged wireless signals. For example, a retail store can offer wireless network access on its premises to its customers.

The wireless device 100 includes an input interface 106. The input interface 106 can receive user inputs from an input device and convert the user inputs into user commands. For example, input devices can include a touch screen display, a keypad, a microphone, a pointer device, a scroll wheel, a camera, or other input devices.

The wireless device 100 includes an output interface 108. The output interface 108 transmits output to an output device in a form accessible to the user 114. For example, output devices can include a display screen, a speaker, an audio-out jack, an electro-mechanical motor for providing tactile output, or other output devices.

The wireless device 100 includes a memory 110. The memory 110 can be read-only or read-write, persistent or volatile memory accessible to the processor 102. The memory 110 can store data required by the wireless device 100 for execution.

The wireless device 100 can be used by a user 114. The user can operate the wireless device 100 to retrieve and view content, and also to view server-selected relevant content selected, in part, based on the wireless device 100's physical location and local time.

In operation, the user 114 can visit a brick-and-mortar store to view and test products for purchase. This is particularly true for products where product "feel" and "fit" are important, as discussed above. After the user 114 has decided on a product, he enters a search command into the wireless device 100 for the product. For example, the user 114 can wish to comparison shop for a lower price on the product or a similar product.

For example, the search command can include a product description in such as a product brand or name, a product category, a product location, a Universal Product Code (UPC), a International Standard Book Number (ISBN), or any other identifier identifying a product.

The product description can be text entered via the input interface 106. The product description can be a digital picture taken by a camera of the wireless device 100, for example, of the UPC or ISBN, the product name and brand, or any other identifier. The product description can be a verbal dictation to the wireless device 100. The search command can be executed at a server in communication with the wireless device 100 over the wireless network.

In response, the server can conduct a search in a retailer database and transmit search results to the wireless device 100. The search results can include nearby brick-and-mortar stores and online stores offering the searched for product or similar products.

The user 114 can review the search results and decide to buy the product or similar products at the brick-and-mortar store or one of the nearby brick-and-mortar stores or online stores listed in the search results. This gives the user flexibility and freedom in selecting who will fulfill his purchase.

Figure 2:
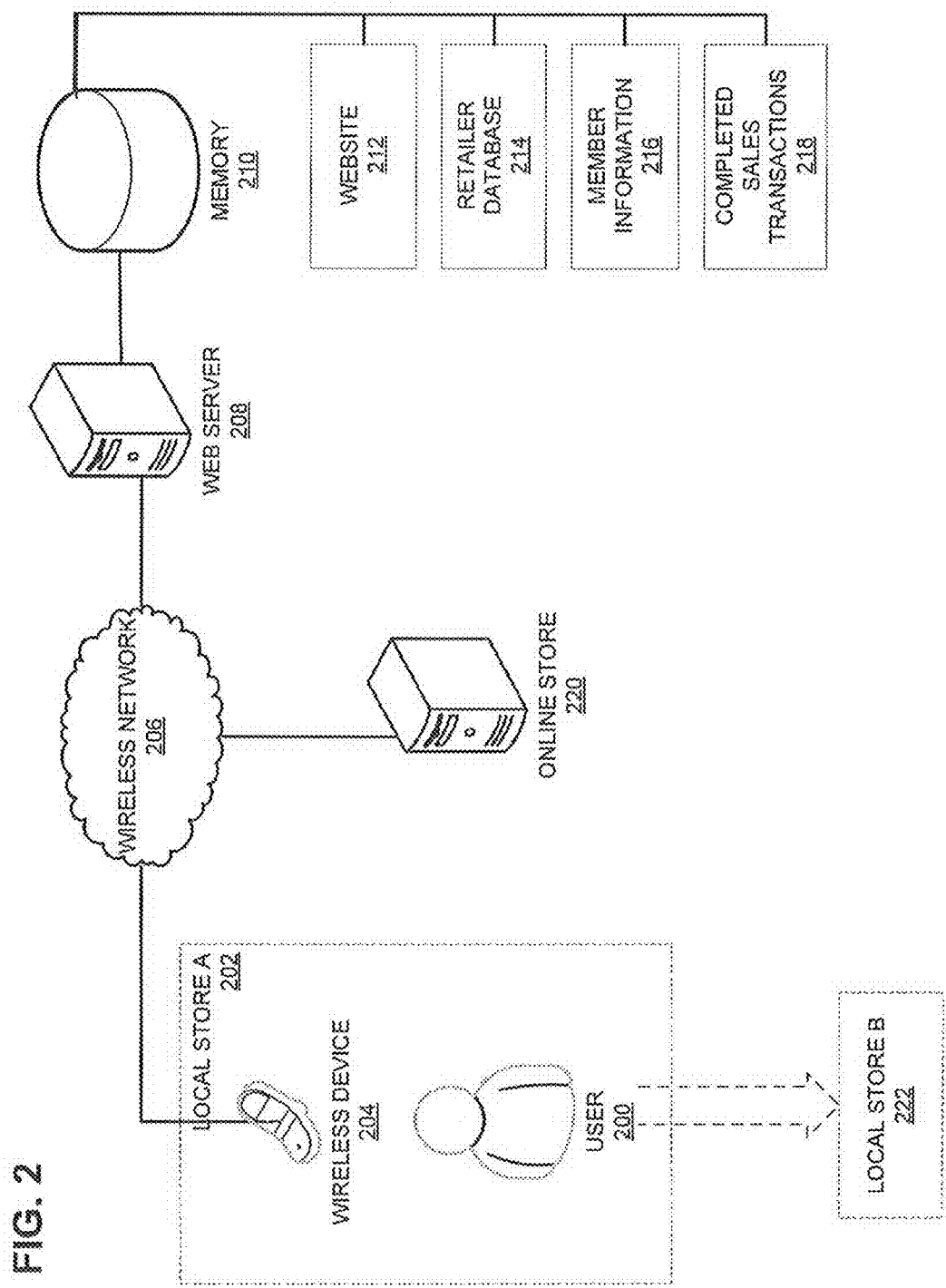
FIG. 2 depicts an example system for processing purchases from a wireless device.

FIG. 2 depicts an example system for processing purchases from a wireless device. A user 200 at a local store 202 can use a wireless device 204 to communicate with a web server 208. The user 200 can submit search commands related to a product and receive search results on where the product or similar products can be found and at what prices. This allows the user 200 to comparison shop and purchase from alternative venues even when in a local brick-and-mortar store 202.

The user 200 visits a local store 202. The local store 202 can be a brick-and-mortar retail store with products for sale, as discussed above. The local store 202 can provide show floor models of products for examination and testing by the user 200.

The user 200 accesses a mobile device 204 during his examination and testing of a product. For example, the user 200 can desire to comparison shop after examining and testing the product. The user 200 can desire to comparison shop for a better price or for similar products.

The mobile device 204 can be as illustrated in FIG. 1 and be in communication with a wireless network 206. The wireless network 206 can be a cellular network including cellular signals transmitted from cellular towers. The wireless network 206 can support protocols such as GSM, CDMA, or any other wireless protocol. The wireless network 206 can support voice, data, or other signals.

A web server 208 is in communications with the wireless network 206. The web server 208 can be a computing device configured to receive web requests and serve web pages. The web server 208 can be in communication with the wireless network 206 through a wired network (not depicted) and a wireless network server (not depicted).

The web server 208 can provide access to members only. Before processing the user 200's search command, a member identifier must be received and authenticated.

The search command can be filtered, for example, by a user 200's present location. The mobile device 204 can include a position determining module that provides a present location.

The web server 208 includes a memory 210. The memory 210 can be accessible read-write memory storing information and data required by the web server 208.

The memory 210 stores a website 212. The website 212 includes one or more webpages written in Hypertext Markup Language (HTML) or another standard language for displaying content. The website 212 can provide search functionality to comparison for lower-priced or similar products.

The memory 210 stores a retailer database 214. The retailer database 214 can store a list of online stores and brick-and-mortar stores. For example, the listed stores can be paying merchant members of the website. The retailer database 214 can also store products carried by the stores and associated prices. The product listings and prices can be periodically updated.

In an alternative embodiment, the retailer database 214 can store an address to a catalog offered by each store. For example, a store can retain better control over its product listings and prices by providing its own sales server that provides product listings and prices on demand.

The retailer database 214 can also retrieve product and price information without help from the stores. For example, the retailer database 214 can be populated with data retrieved from store webpages and catalogs.

The memory 210 stores a member information 216. Each member of the website is associated with member information, such as a member identifier, preferences, payment information and a shipping address. The member identifier can be used to authenticate the user 200 before executing search commands and transmitting search results. The user 200 can have payment information and shipping address in the member information 216, used to process sales transactions made in online stores in the search results.

The memory 210 stores completed sales transactions 218. Details on each completed sales transaction processed by the web server 208 can be stored in memory 210. For example, the completed sales transactions 218 can be used for audit or other purposes. In one example embodiment, online stores can pay for each completed sales transaction processed by the web server 208 in response to a search command by the user 200. The completed sales transactions 218 facilitate record keeping by an administrator. Further, the completed sales transactions 218 can be used to compile sales statistics and allow the administrator to modify search algorithms to produce a more optimal search results in response to the user 200's search command.

In response to the user 200's search request, the web server 208 executes a search in the retailer database 214. The web server 208 can search for a specific product at a lowest price, or similar products at comparable prices. The web server 208 can filter the search results by location of a brick-and-mortar store, a rating of an online store, or by any other criteria.

The search results are transmitted to the mobile device 204 for display to the user 200. The search results can include nearby brick-and-mortar stores offering the product or similar products. The search results can also include online stores offering the product or similar products.

The user 200 can decide to purchase from an online store 220, which was included in the search results. The user 200 can view the search results on the wireless device 204, select an entry displaying the online store 220, and transmit a purchase command. The purchase command is executed by the web server 208 and the online store 220 in conjunction with member information 216. This allows immediate purchase by the user 200 from the wireless device 204 without additional user input. Because the user 200 is associated with a member identifier on the web server 208, member information associated with the user 200 can be easily retrieved from the member information 216.

Alternative, the user 200 can send a search result to himself or another (for example, a friend) via short message or email.

Payment for the sales transaction is processed from payment information stored in member information 216. Once payment has been successfully processed, the online store 220 initiates a shipping process. Shipping information other details are used to fulfill the sales transaction.

Alternatively, the user 200 can decide to visit a nearby brick-and-mortar local store 222 for purchasing. For example, the local store 222 can offer a lower price, or a similar product better suited to the user 200's needs or desires. Shopping at a brick-and-mortar store has the advantage of immediate possession if the store carries the product in stock. This is advantageous to the user 200 if he needs the product immediately.

In an alternative embodiment, the web server 208 can be a server communicating with the wireless device 204 through a predefined protocol. The server supports search commands, executing searches, and processing sales transactions.

In an alternative embodiment, the server can receive search commands and purchase commands from a client installed on the wireless device 204. This can reduce the complexity of the server.

In an alternative embodiment, the system can support purchases of services instead of products, or services combined with products. In an alternative embodiment, the system can support purchases of anything of value.

FIG. 3 depicts an example procedure for processing purchases from a wireless device. A user utilizes a wireless device in communication with a server. The procedure can execute on a web server or server as depicted in FIG. 2 in response to commands received from a wireless device. The wireless device can be as depicted in FIG. 1.

In 300, the server optionally receives a member identifier from the user via the wireless device. The member identifier is associated with the user and authenticates the user to the server. For example, the server can serve a purchasing website that is available to members only.

The member identifier can be any identifier that identifies the user. For example, the member identifier can be a unique wireless device identifier associated with the wireless device. For example, the member identifier can be a username and password pair entered by the user on the wireless device. For example, the member identifier can be automatically generated by the server during a user registration process. The member identifier can be stored on the wireless device and transmitted to the server when the user attempts to execute a search command.

It will be appreciated that the member identifier can be generated, stored, and transmitted in any other manner. The transmitted member identifier can be encrypted or otherwise secured.

In 302, the server determines whether a search command has been received from the wireless device. The user can examine a product for sale in a brick-and-mortar store by touching, looking, and feeling the product. The user can make a purchase decision, but wish to comparison shop for a better price or similar products.

It will be appreciated that the member identifier can be received with the search command, instead of being separately transmitted in 300.

The search command can include information or criteria identifying a product or products to be searched for. For example, the search command can include a product name, a product UPC, a product photograph, or any other description of a product or products.

If a search command is received, the server can proceed to 304. If a search command is not received, the server can continue to wait at 302. The server can initiate a timer so that a time out will occur if a search command is not received within a predetermined amount of time. The server will exit the procedure and release resources dedicated to executing the procedure.

In 304, the server executes the search command in the retailer database. The server can first parse the search command to determine the product to be searched for. For example, the search can include a product name, a product UPC, a product photograph, or any other description of a product or products. The server executes the search command in the retailer database with appropriate criteria and filters, producing search results.

The search results can be further filtered by a location of the wireless device. For example, brick-and-mortar stores that are far away from the user are less relevant because the user would not drive far to purchase the same product, unless the product price was substantially cheaper. The search results can also be filtered by product price, as the user would not travel or wait for delivery of the same product at a higher price.

The search results can include both brick-and-mortar stores and online stores. The search results can be biased or weighted as desired to produce desired results.

In 306, the server transmits the search results to the wireless device for display to the user. The search results are generated above in 304. For example, the search results are transmitted over the wireless network to the wireless device. The search results can be encrypted or otherwise secured. The search results include at least one search result entry, the search result entry associated with a store offering the product or a similar product. The search result entry can include a user-accessible link that will receive a user purchase command, indicating a desire to purchase the product from the associated search result entry.

On receiving the search results, the wireless device displays the search results to the user for review. The user can review the search results to comparison shop for products.

In 308, the server determines whether a purchase command has been received from the wireless device. The user can decide to purchase from an online store listed in the search results after reviewing the search results and the online store's product price.

Alternatively, the user can decide to purchase from a nearby brick-and-mortar store after reviewing the search results and the nearby brick-and-mortar store's product price.

It will be appreciated that the member identifier can be received with the purchase command, instead of being separately transmitted in 300.

If a purchase command has been received, the server proceeds to 310. If a purchase command has not been received, the server remains in 308. The server can initiate a timer so that a time out will occur if a purchase command is not received within a predetermined amount of time. The server will exit the procedure and release resources dedicated to executing the procedure.

In 310, the server processes the received purchase command and completes the sales transaction. The purchase command is received above in 308.

If the purchase command is associated with an online store, the server can initiate a sales transaction processing module. For example, the server can retrieve member information, including payment and shipping information, from memory for use in completing the sales transaction. By automating and simplifying the purchasing process for the user, the server encourages product comparisons and purchases by the user.

If the purchase command is associated with a nearby brick-and-mortar store, the server can transmit directions from the user's present location to the nearby brick-and-mortar store. The server can also transmit relevant information such as the store's operating hours, contact information, etc.

Alternatively, the server can retrieve and transmit a list of related deals at the nearby brick-and-mortar store or the local store 200. This allows cross-selling and up-selling products to the user.

In 312, the server optionally initiates a shipping process that ships the product to the user. For example, if the purchase command is associated with an online store above in 310, the purchased product must be shipped to the user. The server provides a shipping address retrieved from member information to the shipping process, which fulfills the sales transaction.

The server can also store details related to the completed sales transaction in memory for audit, analytics, and review purposes.

In 314, the procedure ends.

The system and procedure discussed above gives the user to easily comparison shop for a product or related products, even when within a brick-and-mortar store away from a wired Internet connection. The server can monetize user traffic by charging a membership fee to all users, by charging a search fee for each search command, by charging an advertising fee to brick-and-mortar and online stores for inclusion in the search results, by charging a referral fee when a user purchases at an online store via the server, by charging a referral fee when a user requests directions to a nearby brick-and-mortar store, at any other predetermined condition, or any combination of the above.

As discussed above, an example embodiment of the present invention can be a method for processing purchases from a wireless device. The method comprises, responsive to a search command received from the wireless device, executing a search in a retailer database. The method comprises transmitting a search result to the wireless device for display. The method comprises, responsive to a purchase command received from the wireless device, processing a sales transaction with a selected retailer. The sales transaction can be for a product. The method comprises shipping the purchased product at the completion of the sales transaction. The method comprises receiving a member identifier from the wireless device along with the search command and the purchase command. The sales transaction can be completed with member information associated with the member identifier. The search command can include at least one of: a product name, a Universal Product Code, and a machine-readable code scanned by the wireless device. The retailer database can include nearby brick-and-mortar stores and online stores.

Another example embodiment of the present invention can be a system for processing purchases from a wireless device. The wireless device comprises a memory storing a retailer database. The wireless device comprises a server in communication with the memory and a mobile device. The server is configured to, responsive to a search command received from the wireless device, execute a search in the retailer database. The server is configured to transmit a search result to the wireless device for display. The server is configured to, responsive to a purchase command received from the wireless device, processing a sales transaction with a selected retailer. The sales transaction can be for a product. The server is configured to initiate shipping the purchased product at the completion of the sales transaction. The server is configured to receive a member identifier from the wireless device along with the search command and the purchase command. The sales transaction can be completed with member information associated with the member identifier. The search command can include at least one of: a product name, a Universal Product Code, and a machine-readable code scanned by the wireless device. The retailer database can include nearby brick-and-mortar stores and online stores.

Another example embodiment of the present invention can be a computer-readable medium including instructions adapted to execute a method for processing purchases from a wireless device. The method comprises transmitting a search result to the wireless device for display. The method comprises, responsive to a purchase command received from the wireless device, processing a sales transaction with a selected retailer. The sales transaction can be for a product. The method comprises shipping the purchased product at the completion of the sales transaction. The method comprises receiving a member identifier from the wireless device along with the search command and the purchase command. The sales transaction can be completed with member information associated with the member identifier. The search command can include at least one of: a product name, a Universal Product Code, and a machine-readable code scanned by the wireless device. The retailer database can include nearby brick-and-mortar stores and online stores.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method for processing purchases from a wireless device, comprising:
   responsive to a search command received from the wireless device, executing a search in a retailer database to generate a set of search results, wherein each search result is associated with a retailer location and a product price;
   receiving a local price wherein the local price is at least one of: detected by the wireless device and inputted by a wireless device user
   receiving a current wireless device current position from a wireless device location determining module at a server computer;
   computing, by the server computer, a distance from the wireless device current position to a retailer location associated with a search result;
   computing, by the server computer, a price savings from the local price and the product price associated with at least one of the search results;
   filtering the search results with a weighted relevance function based on the distance and the price savings associated with each search result;
   transmitting the filtered search results to the wireless device for display; and
   responsive to a purchase command received from the wireless device, processing a sales transaction with a selected retailer selected from the filtered search results, wherein the selected retailer is geographically remote from the wireless device current position.

2. The method of claim 1, wherein the sales transaction is for a product.

3. The method of claim 1, further comprising:
   receiving a member identifier from the wireless device along with the search command and the purchase command.

4. The method of claim 3, wherein the sales transaction is completed with member information associated with the member identifier.

5. The method of claim 1, wherein the search command includes at least one of: a user speech sample, a product photograph, a product name, a Universal Product Code, and a machine-readable code scanned by the wireless device.

6. The method of claim 1, wherein the retailer database includes nearby brick-and-mortar stores and online stores.

7. A system for processing purchases from a wireless device, comprising:
 a memory storing retailer database; and
 a server in communication with the memory and a wireless device, the server configured to
 responsive to a search command received from the wireless device, executing a search in a retailer database to generate a set of search results, wherein each search result is associated with a retailer location and a product price;
 receive a local price wherein the local price is at least one of: detected by the wireless device and inputted by a wireless device user
 receive a current wireless device current position from a wireless device location determining module;
 computing a distance from the wireless device current position to a retailer location associated with a search result;
 computing a price savings from the local price and the product price associated with at least one of the search results;
 filter the search results with a weighted relevance function based on the distance and the price savings associated with each search result;
 transmit the filtered search results to the wireless device for display; and
 responsive to a purchase command received from the wireless device, processing a sales transaction with a selected retailer selected from the filtered search results, wherein the selected retailer is geographically remote from the wireless device current position.

8. The system of claim 7, wherein the sales transaction is for a product.

9. The system of claim 7, the server further configured to receive a member identifier from the wireless device along with the search command and the purchase command.

10. The system of claim 9, wherein the sales transaction is completed with member information associated with the member identifier.

11. The system of claim 7, wherein the search command includes at least one of: a user speech sample, a product photograph, a product name, a Universal Product Code, and a machine-readable code scanned by the wireless device.

12. The system of claim 7, wherein the retailer database includes nearby brick-and-mortar stores and online stores.

13. A computer-readable storage medium including instructions adapted to execute a method for processing purchases from a wireless device, the method comprising:
 responsive to a search command received from the wireless device, executing a search in a retailer database to generate a set of search results, wherein each search result is associated with a retailer location and a product price;
 receiving a local price wherein the local price is at least one of: detected by the wireless device and inputted by a wireless device user
 receiving a current wireless device current position from a wireless device location determining module at a server computer;
 computing, by the server computer, a distance from the wireless device current position to a retailer location associated with a search result;
 computing, by the server computer, a price savings from the local price and the product price associated with at least one of the search results;
 filtering the search results with a weighted relevance function based on the distance and the price savings associated with each search result;
 transmitting the filtered search results to the wireless device for display; and
 responsive to a purchase command received from the wireless device, processing a sales transaction with a selected retailer selected from the filtered search results, wherein the selected retailer is geographically remote from the wireless device current position.

14. The medium of claim 13, wherein the sales transaction is for a product.

15. The medium of claim 13, the method further comprising:
 receiving a member identifier from the wireless device along with the search command and the purchase command, wherein the sales transaction is completed with member information associated with the member identifier.

16. The medium of claim 13, wherein the search command includes at least one of: a user speech sample, a product photograph, a product name, a Universal Product Code, and a machine-readable code scanned by the wireless device.

17. The medium of claim 13, wherein the retailer database includes nearby brick-and- mortar stores and online stores.

18. A method for processing purchases from a wireless device, comprising:
 responsive to a search command received from the wireless device, executing a search in a retailer database to generate a set of search results, wherein the search command includes a product photograph and the search is based on the product photograph, and each search result is associated with a retailer location and a product price;
 receiving a local price wherein the local price is at least one of: detected by the wireless device and inputted by a wireless device user
 receiving a current wireless device current position from a wireless device location determining module at a server computer;
 computing, by the server computer, a distance from the wireless device current position to a retailer location associated with a search result;
 computing, by the server computer, a price savings from the local price and the product price associated with at least one of the search results;
 filtering the search results with a weighted relevance function based on the distance and the price savings associated with each search result, wherein search results with a weighted relevance score below a predetermined threshold are discarded;
 transmitting the filtered search results to the wireless device for display; and
 responsive to a purchase command received from the wireless device, processing a sales transaction with a selected retailer selected from the filtered search results, wherein the selected retailer is geographically remote from the wireless device current position.

* * * * *